(12) United States Patent
Kodama

(10) Patent No.: US 8,135,223 B2
(45) Date of Patent: Mar. 13, 2012

(54) IMAGE PROCESSING APPARATUS AND METHOD OF IMAGE PROCESSING

(75) Inventor: Taku Kodama, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1027 days.

(21) Appl. No.: 12/047,839

(22) Filed: Mar. 13, 2008

(65) Prior Publication Data

US 2008/0226186 A1     Sep. 18, 2008

(30) Foreign Application Priority Data

Mar. 16, 2007  (JP) .................. 2007-069632
Feb. 25, 2008  (JP) .................. 2008-043464

(51) Int. Cl.
*G06K 9/36*   (2006.01)
*G06K 9/46*   (2006.01)

(52) U.S. Cl. ..................... 382/232; 382/240

(58) Field of Classification Search ............... 382/162, 382/173, 232, 240
See application file for complete search history.

(56) References Cited

U.S. PATENT DOCUMENTS

| | | | |
|---|---|---|---|
| 7,127,117 B2 | 10/2006 | Sano et al. | |
| 7,158,679 B2 | 1/2007 | Sano et al. | |
| 7,245,775 B2 | 7/2007 | Kodama et al. | |
| 7,293,172 B2 | 11/2007 | Nishimura et al. | |
| 7,310,447 B2 | 12/2007 | Yano et al. | |
| 7,315,651 B2 | 1/2008 | Sakuyama et al. | |
| 7,319,792 B2 | 1/2008 | Hara et al. | |
| 7,333,664 B2 | 2/2008 | Sakuyama et al. | |
| 7,336,852 B2 | 2/2008 | Nomizu et al. | |
| 2002/0087728 A1* | 7/2002 | Deshpande et al. | 709/246 |
| 2003/0202581 A1 | 10/2003 | Kodama | |
| 2004/0078491 A1* | 4/2004 | Gormish et al. | 709/247 |
| 2004/0095477 A1 | 5/2004 | Maki et al. | |
| 2004/0100654 A1 | 5/2004 | Kodama et al. | |
| 2004/0126019 A1 | 7/2004 | Ikebe et al. | |
| 2004/0126029 A1 | 7/2004 | Sakuyama et al. | |
| 2004/0130570 A1 | 7/2004 | Sakuyama et al. | |
| 2004/0131262 A1 | 7/2004 | Hara et al. | |
| 2004/0131264 A1 | 7/2004 | Sakuyama et al. | |
| 2004/0134978 A1 | 7/2004 | Hara et al. | |

(Continued)

FOREIGN PATENT DOCUMENTS

JP     2003-169333     6/2003

(Continued)

OTHER PUBLICATIONS

Japanese Office Action issued Nov. 8, 2011, in Japanese Patent Application No. 2008-043464.

*Primary Examiner* — Phuoc Tran

(74) *Attorney, Agent, or Firm* — Oblon, Spivak, McClelland, Maier & Neustadt, L.L.P.

(57) ABSTRACT

An image processing apparatus that generates a code stream that encodes image data and includes a dividing unit that divides the image data into at least one rectangular area, a conversion unit that converts data of the rectangular area into conversion data, an ordering unit that adds the priority order to the conversion data, an encoding unit that rearranges the conversion data based on the priority order and encodes the conversion data into the code stream, and a coupling unit that adds a marker in the header part of the conversion data that identifies the priority order of the conversion data in the code stream.

4 Claims, 14 Drawing Sheets

U.S. PATENT DOCUMENTS

| | | |
|---|---|---|
| 2004/0141651 A1 | 7/2004 | Hara et al. |
| 2004/0146160 A1 | 7/2004 | Nomizu et al. |
| 2004/0151385 A1* | 8/2004 | Oneda et al. ................. 382/232 |
| 2004/0151386 A1 | 8/2004 | Kodama et al. |
| 2004/0151387 A1 | 8/2004 | Sakuyama et al. |
| 2004/0156548 A1 | 8/2004 | Kodama et al. |
| 2004/0165780 A1 | 8/2004 | Maki et al. |
| 2004/0190782 A1 | 9/2004 | Nomizu et al. |
| 2004/0201593 A1 | 10/2004 | Nishimura et al. |
| 2004/0202371 A1 | 10/2004 | Kodama et al. |
| 2004/0202372 A1 | 10/2004 | Sakuyama et al. |
| 2004/0208379 A1 | 10/2004 | Kodama et al. |
| 2004/0208380 A1 | 10/2004 | Aoki et al. |
| 2004/0212843 A1 | 10/2004 | Kodama et al. |
| 2004/0213466 A1 | 10/2004 | Kodama et al. |
| 2004/0213472 A1 | 10/2004 | Kodama et al. |
| 2004/0217887 A1 | 11/2004 | Nomizu et al. |
| 2004/0218817 A1 | 11/2004 | Kodama et al. |
| 2004/0252897 A1 | 12/2004 | Hara et al. |
| 2005/0036701 A1 | 2/2005 | Miyazawa et al. |
| 2005/0053239 A1 | 3/2005 | Nomizu et al. |
| 2005/0074172 A1 | 4/2005 | Kodama |
| 2005/0207659 A1 | 9/2005 | Kodama |
| 2007/0076962 A1 | 4/2007 | Kodama |
| 2007/0110163 A1 | 5/2007 | Kodama |

FOREIGN PATENT DOCUMENTS

| | | |
|---|---|---|
| JP | 2005-012685 | 1/2005 |

\* cited by examiner

FIG. 8

PROGRESSIVE ORDER RPCL

| MH | SOT0 | R0C0 | R0C1 | R0C2 | R1C0 | R1C1 | R1C2 | R2C0 | R2C1 | R2C2 | R3C0 | R3C1 | R3C2 |

| SOT1 | R0C0 | R0C1 | R0C2 | R1C0 | R1C1 | R1C2 | R2C0 | R2C1 | R2C2 | R3C0 | R3C1 | R3C2 |

...

| SOTn | R0C0 | R0C1 | R0C2 | R1C0 | R1C1 | R1C2 | R2C0 | R2C1 | R2C2 | R3C0 | R3C1 | R3C2 |

FIG. 9

TILE PART OF EACH RESOLUTION

| MH | SOT0 | R0C0 | R0C1 | R0C2 | SOT1 | R0C0 | R0C1 | R0C2 | SOT2 | R0C0 | R0C1 | R0C2 |

| SOT0 | R1C0 | R1C1 | R1C2 | SOT1 | R1C0 | R1C1 | R1C2 | SOT2 | R1C0 | R1C1 | R1C2 |

| SOT0 | R2C0 | R2C1 | R2C2 | SOT1 | R2C0 | R2C1 | R2C2 | SOT2 | R2C0 | R2C1 | R2C2 |

| SOT0 | R3C0 | R3C1 | R3C2 | SOT1 | R3C0 | R3C1 | R3C2 | SOT2 | R3C0 | R3C1 | R3C2 |

...

| SOTn | R0C0 | R0C1 | R0C2 |

| SOTn | R1C0 | R1C1 | R1C2 |

| SOTn | R2C0 | R2C1 | R2C2 |

| SOTn | R3C0 | R3C1 | R3C2 |

| MH | SOT0 | R0C0 | R0C1 | R0C2 | SOT0 | R1C0 | R1C1 | R1C2 | SOT0 | R2C0 | R2C1 | R2C2 | SOT0 | R3C0 | R3C1 | R3C2 |
| | SOT1 | R0C0 | R0C1 | R0C2 | SOT1 | R1C0 | R1C1 | R1C2 | SOT1 | R2C0 | R2C1 | R2C2 | SOT1 | R3C0 | R3C1 | R3C2 |
| | SOT2 | R0C0 | R0C1 | R0C2 | SOT2 | R1C0 | R1C1 | R1C2 | SOT2 | R2C0 | R2C1 | R2C2 | SOT2 | R3C0 | R3C1 | R3C2 |
| | ... | | | | | | | | | | | | | | | |
| | SOTn | R0C0 | R0C1 | R0C2 | SOTn | R1C0 | R1C1 | R1C2 | SOTn | R2C0 | R2C1 | R2C2 | SOTn | R3C0 | R3C1 | R3C2 |

SPECTRUM DETECTION UNIT — 41a, 41b, 41c, 41d

COUPLING UNIT — 43a, 43b, 43c, 43d

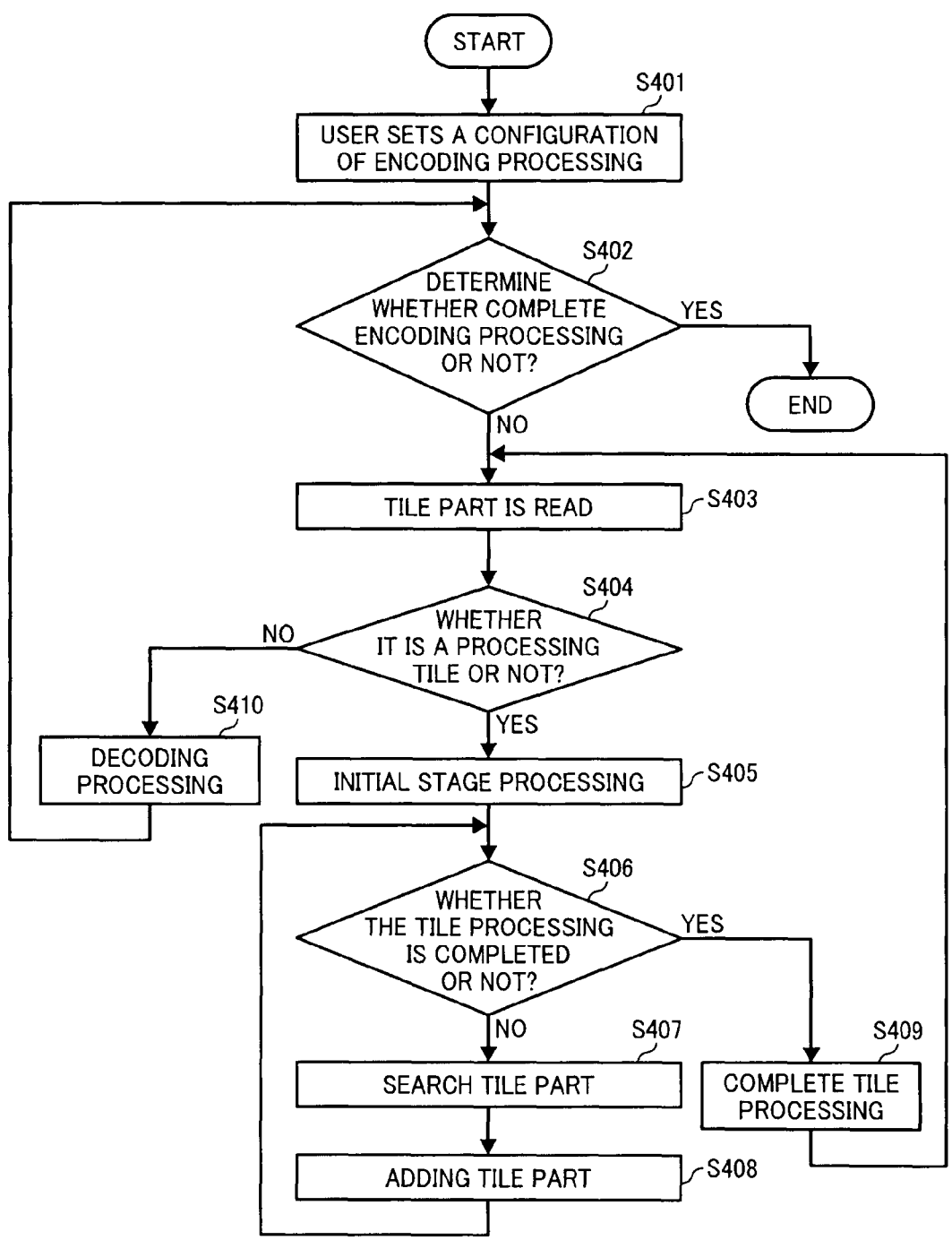

IMAGE PROCESSING APPARATUS AND METHOD OF IMAGE PROCESSING

CROSS-REFERENCE TO RELATED APPLICATIONS

The present application claims priority to Japanese Patent Application No. 2007-069632, filed Mar. 16, 2007, and Japanese Application No. 2008-043464, filed Feb. 25, 2008. The entire contents of the above-identified applications are incorporated herein by reference.

BACKGROUND OF THE INVENTION

1. Field of the Invention

The present invention relates to an image processing apparatus and a method of image processing, which generates a code stream by encoding image data.

2. Description of the Background Art

Recently, a system has been proposed in which image data is divided into at least one rectangular area, and the at least one rectangular area is compressed independently. These rectangular areas are processed according to the following processes: color conversion processing, resolution conversion processing, regional division processing, and bit-plane division processing. Arithmetic coding processing involves processing the data that is generated by the above processing (color conversion processing, resolution conversion processing, regional division, and bit-plane division). As a result, code data is generated by the arithmetic coding processing, and the code stream is generated by rearranging the code data.

The order of rearranging the code data is known as a progressive order. There are five kinds of progressive order. One of the progressive orders is selected and code data is rearranged based on the selected progressive order. If a user wants to display a low resolution image on a display device, the image data is encoded using the RPCL progressive order, and it is possible to display of the order of the resolution.

For example, Japanese Patent Laid-open No. 2005-12685 records information transferred to the client device in past times as historical information. When the client device receives a request command and requests a packet data in the rectangular area, a kind of progressive order is determined based on the historical information. An order of the packet data that is transferred to the client device is decided corresponding to the result of the determination. Further, the packet data in the rectangular area is transferred to the client device based on the order of the packet.

However, it is necessary to process code data of all rectangular areas at the same time, in order of a resolution array of the code data of all rectangular areas, if the code data is generated in order of the resolution. A large amount of processing time and memory used by the code data are needed by this processing. As a result, there is a problem of the increase in processing time and an instability of movement of the equipment. In addition, when the code data is generated by hardware, the cost is high for similar reasons.

SUMMARY OF THE INVENTION

The present invention is designed to solve the above-described problems with respect to an order of arranging code data. In a preferred embodiment, an image processing apparatus that generates a code stream that encodes image data includes a dividing unit configured to divide the image data into at least one rectangular area, a conversion unit configured to convert the rectangular area divided by the dividing unit into conversion data, an ordering unit configured to add the priority order to the conversion data, an encoding unit configured to rearrange the conversion data based on the priority order and encode the conversion data into the code stream, and a coupling unit configured to add a marker that can identify the priority order in a header part of the conversion data in the code stream.

BRIEF DESCRIPTION OF THE DRAWINGS

The above and other objects, features, and advantages of the present invention will become more apparent from the following detailed description taken with the accompanying drawings, in which:

FIG. 8 is an explanation chart for the rearranging of the code data in the RPCL Progressive order;

FIG. 9 shows the tile part of each resolution;

FIG. 18 is a flow diagram showing an example of the image processing program 10 in fourth embodiment.

DESCRIPTION OF THE PREFERRED EMBODIMENTS

The embodiments of the present invention will be explained in detail below by referring to the figures.

Figure 1:
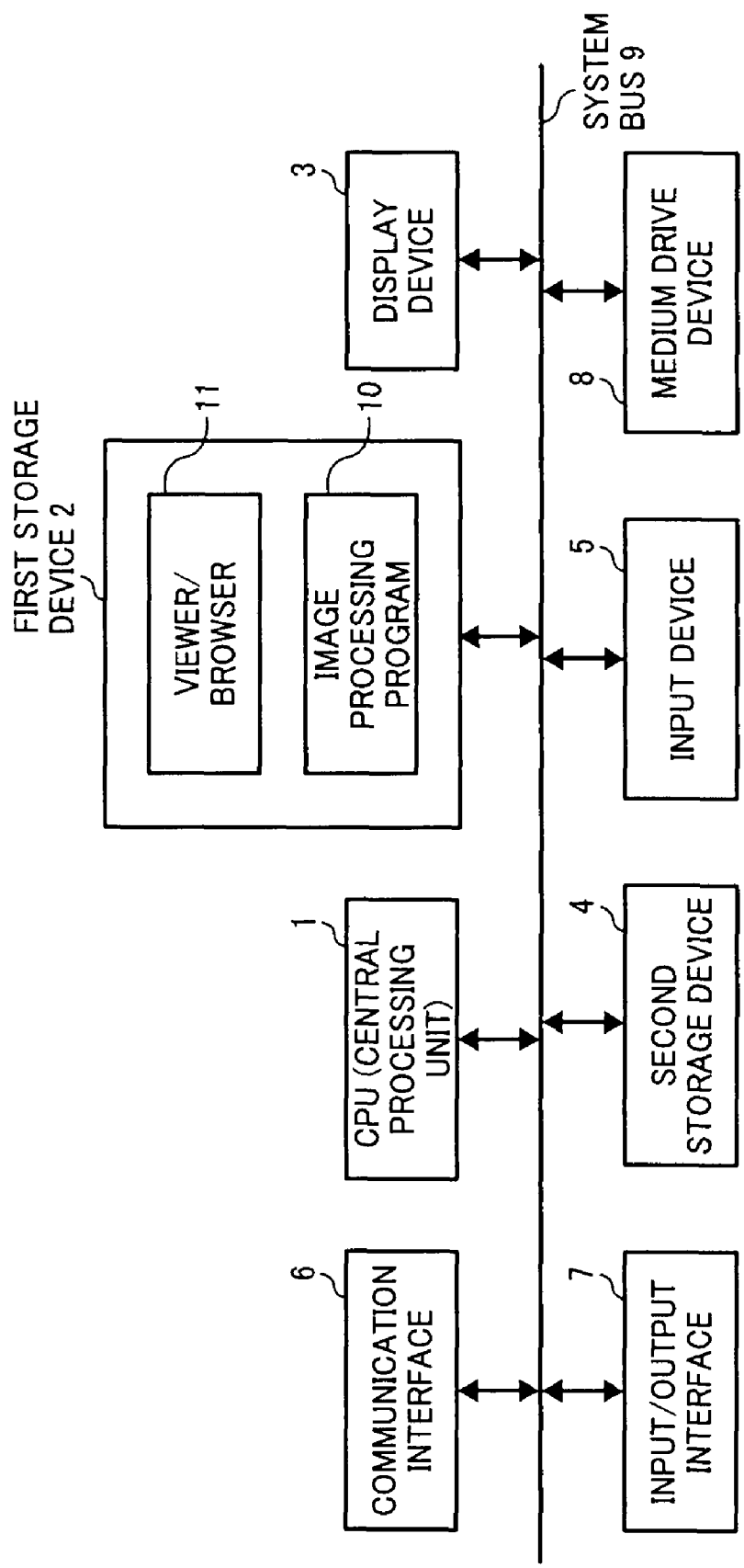
FIG. 1 is a block diagram showing an example of the system configuration for a computer.

FIG. 1 shows an example of the system configuration for the computer. The computer shown in FIG. 1 includes a CPU(Central Processing Unit) 1, a first storage device 2, a display device 3, a second storage device 4, an input device 5, a communication interface 6, an input/output interface 7, and a medium drive device 8. These components are coupled to each other by system bus 9.

The image processing program 10 to implement this invention is recorded in a recording medium. The recording medium is read by the medium drive device 8. The image processing program 10 is stored in the second storage device 7 or stored in the second device 7 via the communication interface 6.

The image processing program 10 is read from the second storage device 4 to the first storage device 2. The image processing of this invention is achieved by implementing the image processing program using the CPU 1 on the computer.

Code data that is generated from a still picture or a motion picture is stored in the server on the network. The code data is read from the server via the communication interface 6. Furthermore, the code data is loaded from the imaging device coupled to the input/output interface 7. The image processing program 10 operates in cooperation with viewer/browser 11.

The image data is divided into at least one rectangular area, and each rectangular area is encoded independently in this invention. In the prior art, if the code data divided into the rectangular area is rearranged in order of the resolution, the function of the tile part is used. After using the function of the tile part, it is possible to rearrange the code data of all rectangular areas. However, the device in the prior art requires more processing time and a large amount of memory when the code data is encoded and decoded by hardware or software. All rectangular areas are not rearranged in the embodiments of the present invention. Furthermore, each rectangular area is processed and the identifier is inserted between the code data for each resolution in this embodiment.

Figure 2:
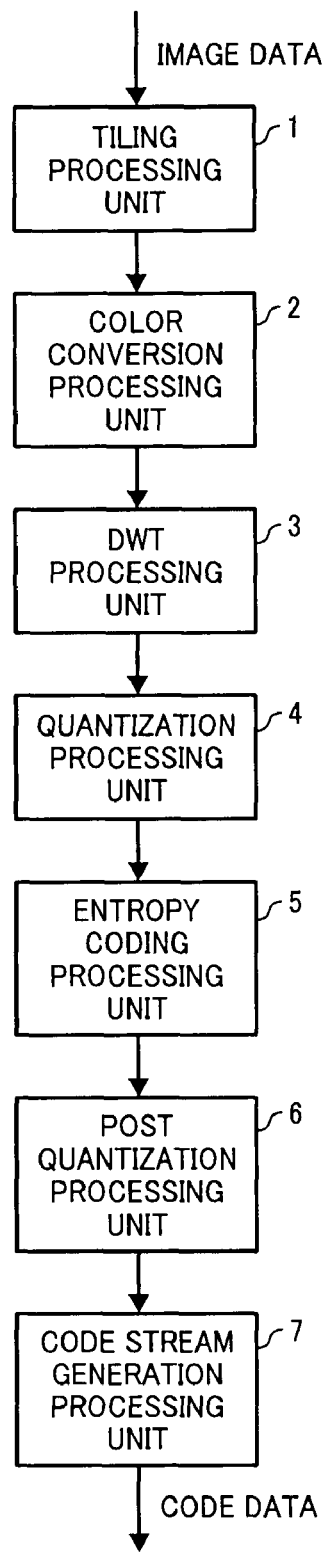
FIG. 2 shows a block diagram of the compression coding processing with JPEG-2000.

When compressing the image data, the code data is generated by processing using color conversion, wavelet transformation, quantization processing, entropy encoding processing and tag processing, in each of the rectangular areas, as shown in FIG. 2.

FIG. 2 shows a block diagram of compression encoding processing with JPEG2000. A description is made of an example of input image data of red, green, and blue (hereinafter referred to as RGB) in color. Input image data of RGB are divided into rectangular block units called tiles by a tiling processing unit 301. If raster-type image data are input, raster/block conversion processing is performed by the tiling processing unit 301. With JPEG2000, it is possible to independently perform encoding and decoding for each tile, reducing the amount of hardware as long as encoding and decoding are performed by the hardware, and to decode only a necessary tile to be displayed. Tiling is optional in JPEG-2000. If tiling is not performed, the number of tiles is regarded as 1.

In step 2, the image data are converted into a luminance/color difference signal by a color conversion processing unit 302. In JPEG2000, two color conversions are defined according to the types (5×3 and 9×7) of a filter used in the Discrete Wavelet Transform (hereinafter referred to as DWT). Prior to the color conversion, a DC level shift is applied to each of the signals of RGB.

After the color conversion, the DWT is applied to the signal for each component by the DWT processing unit 303 to output wavelet coefficients for each component. The DWT is two-dimensionally performed. However, it is generally performed based on the convolution of a one-dimensional filter calculation using a calculation method called lifting calculation.

Figure 3:
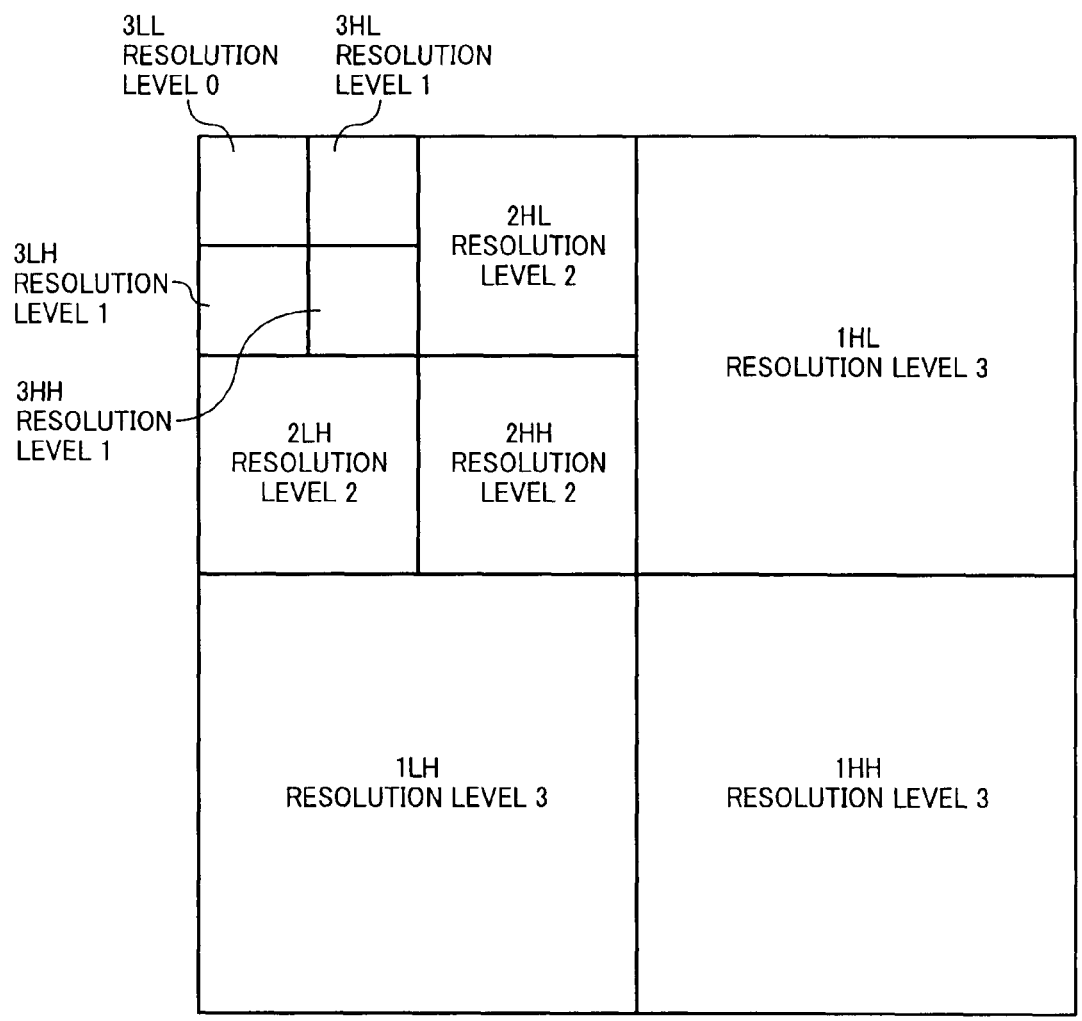
FIG. 3 shows a relationship between a decomposition level and a resolution level.

FIG. 3 shows octave-division wavelet coefficients. The DWT outputs four directional components of LL, HL, LH, and HH called sub-bands for each decomposition level and recursively performs the DWT with respect to the LL sub-band to increase the decomposition level to lower resolution. The coefficients of one decomposition level of the highest resolution are represented as 1 HL, 1 LH, and 1 HH, and those of lower resolution are represented as 2 HL, 2 LH , , , and nHH. FIG. 3 shows an example in which the resolution is divided into three decomposition levels. On the other hand, the resolution level is called 0, 1, 2, 3 in the order from the coefficient of lower resolution in the direction opposite to the decomposition levels.

Figure 4:
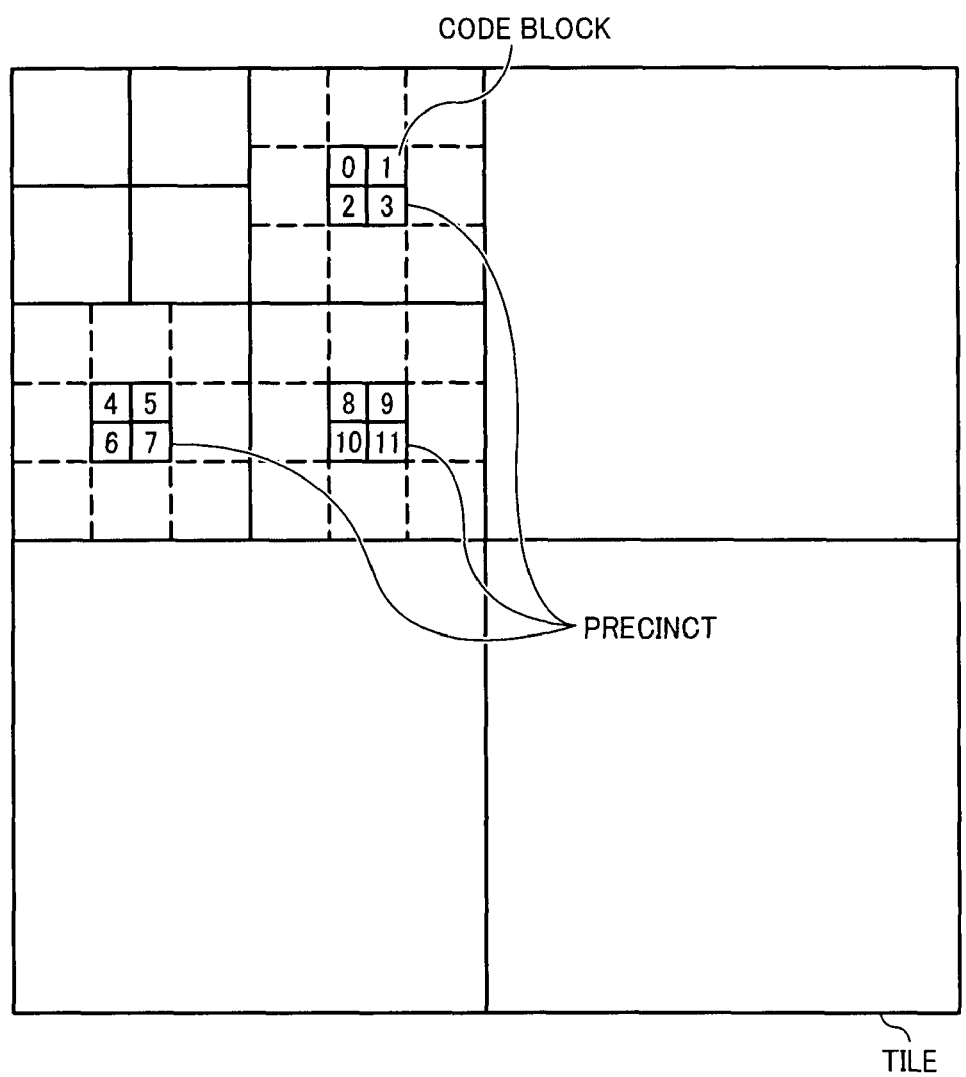
FIG. 4 shows a relationship between a tile, a precinct, and a code block.

As shown in FIG. 4, sub-band at each decomposition level can be divided into areas called precincts where the aggregation of codes is formed. Furthermore, encoding is performed for each predetermined block called a code block. FIG. 4 shows a relationship between the tile, the precinct, and the code block in the wavelet coefficient of the tile.

In step 4, quantization is applied to the wavelet coefficients output from the DWT processing unit 303 by a quantization processing unit 304. However, if an inverse transformation is applied to the wavelet coefficient, the scalar quantization is not applied thereto or the wavelet coefficient is quantized as "1." Furthermore, almost the same effect as the quantization is obtained in the below-described post quantization processing. The scalar quantization allows for the change of parameters for each tile.

In step 5, encoding is applied to the quantization data output from the quantization processing unit 304 by an entropy coding processing unit 305. The entropy encoding method of JPEG-2000 divides the sub-band into rectangular areas called code blocks and performs encoding for each block (or does not divide the sub-band if the size of a sub-band area is smaller than or equal to that of a code block area).

Figure 5:
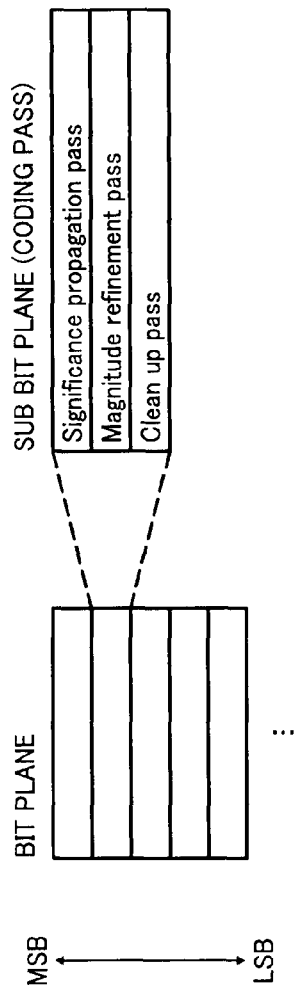
FIG. 5 shows a relationship between a bit plane and a sub-bit plane.

Furthermore, the data of the code block are decomposed into bit planes as shown in FIG. 5. Then, each of the bit planes is divided into three passes (Significance-propagation pass, Magnitude-refinement pass, and Clean-up pass) in accordance with the influence of the conversion coefficient on image quality and individually encoded by an arithmetic coding system called an MQ-coder. The bit plane has greater importance (degree of contribution to image quality) on the side of MSB. On the other hand, the coding passes are in descending order of importance from the Clean-up pass, Magnitude-refinement pass, and the Significance-propagation pass. Furthermore, the terminal of each pass is also called a truncation point, which is a truncatable unit of code in the post-quantization processing described below.

In step 6, entropy-encoded code data are subjected to code truncation processing as needed by the post quantization processing unit 306. If it is necessary to output an inverse code, the post quantization processing is not performed. JPEG-2000 allows for the truncation of a code amount after the encoding, and provides a configuration (one-pass encoding) of eliminating the feedback to control the code amount as the characteristic thereof.

In step 7, in a code stream generation processing unit 307, the code data after the post quantization processing are subjected to processing in which the codes are sorted in accordance with a predetermined progressive order (decoding order of the code data) and a header is added, thereby completing a code stream for the corresponding tile.

Figure 6:
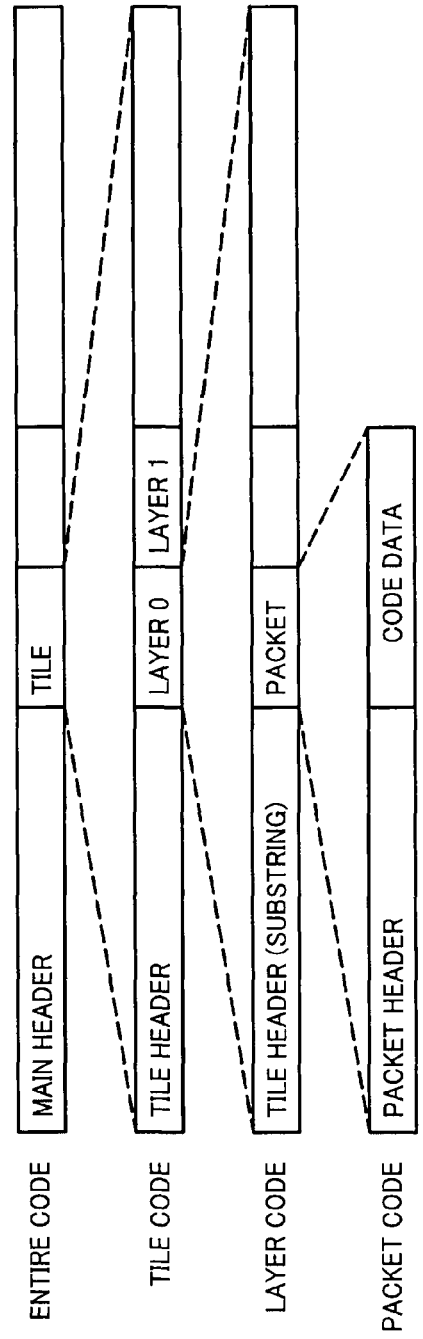
FIG. 6 shows a configuration of a code stream.

FIG. 6 shows the entire code stream by the layer progression of JPEG2000. An entire code stream is composed of a main header and plural tiles formed by dividing an image. A tile code stream is composed of a tile header and plural layers formed by partitioning the code of a tile into the code unit (as is specifically described later) called a layer, and the plural layers are arranged in the ascending order from layer 0, layer 1, , , . A layer code stream is composed of a layering tile header and plural packets. A packet is composed of a packet header and code data. The packet is the minimum unit of the code data and is formed of the code data of one layer of a precinct at one resolution level (decomposition level) of a tile component.

Next, a description is made of the progressive order of JPEG2000. In JPEG2000, the following five progressives are defined by changing the priority of four image elements of image quality (layer (L)), resolution (R), component (C), and position (precinct (P)).

(LRCP Progressive)

Decoding is performed in the order of the precinct, the component, the resolution level, and the layer. Accordingly, the image quality of an entire image is improved as a layer index increases, so that the progressive of the image quality can be achieved. This is also called a layer progressive.

(RLCP Progressive)

Decoding is performed in the order of the precinct, the component, the layer, and the resolution level. Accordingly, it is possible to achieve the progressive of the resolution.

(RPCL Progressive)

Decoding is performed in the order of the layer, the component, the precinct, and the resolution level. Accordingly, it is possible to achieve the progressive of the resolution as in the case of RPCL progressive. However, it is also possible to increase the priority at a specific position.

(PCRL Progressive)

Decoding is performed in the order of the layer, the resolution level, the component, and the precinct. Accordingly, the decoding at a specific position is prioritized, so that the progressive of a space position can be achieved.

(CPRL Progressive)

Decoding is performed in the order of the layer, the resolution level, the precinct, and the component. Accordingly, for example, it is possible to achieve the progressive of the component as in a case in which a gray image is first reproduced when the progressive decoding is applied to a color image.

Figure 7A:
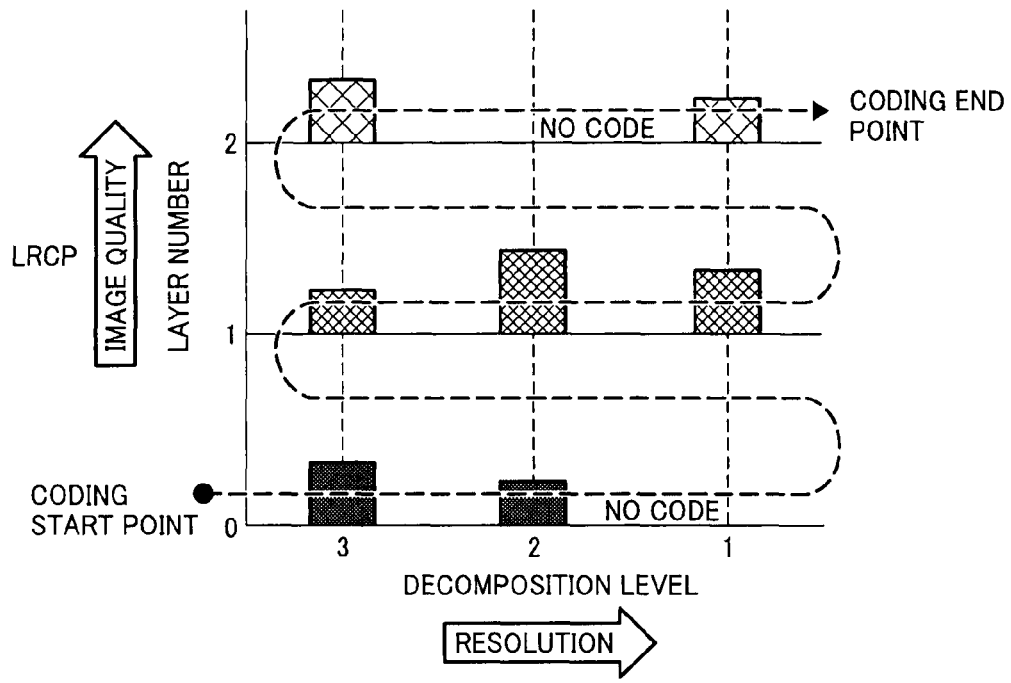
FIGS. 7A and 7B show coding orders of a layer progressive and a resolution progressive.
Figure 7B:
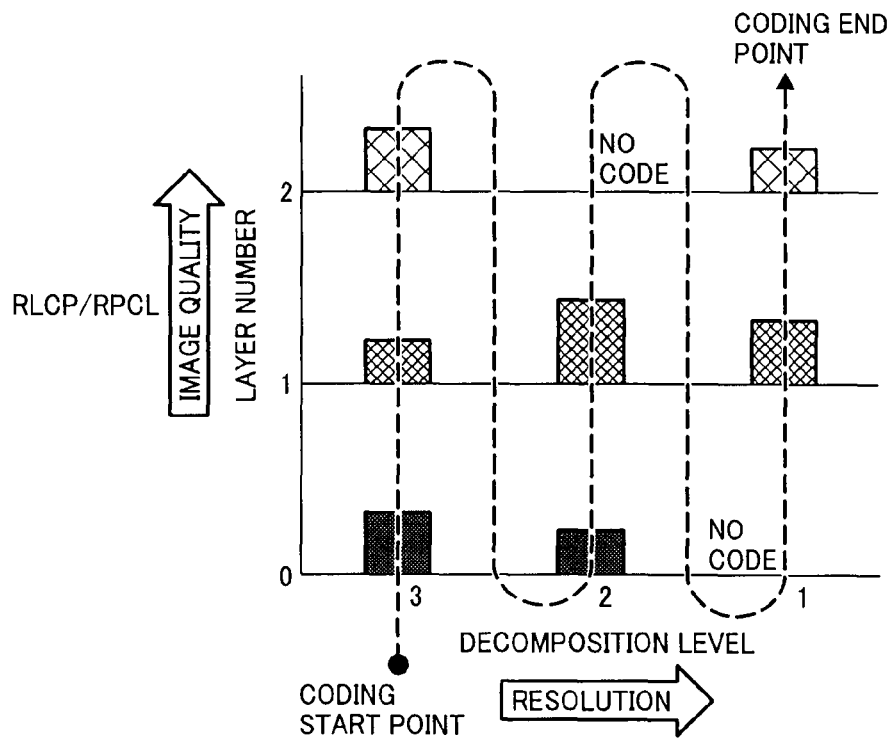

FIGS. 7A and 7B schematically show the progressive order of the LRCP progressive (hereinafter referred to as layer progressive) and that of the RLCP progressive or the RPCL progressive (hereinafter referred to as resolution progressive), respectively. In FIGS. 7A and 7B, the horizontal axis represents decomposition levels (the higher the number is, the lower the resolution is) and the vertical axis represents layer numbers (the higher the number is, the further up the layer is positioned. A higher image quality can be reproduced by adding and decoding the code of the upper layer to the lower layer.). In FIGS. 7A and 7B, the painted (filled in) rectangular graphic forms represent codes at the corresponding decomposition level and layer, and the size thereof schematically represents the proportion of the code amount. The dotted arrows in FIGS. 7A and 7B represent a coding order.

FIG. 7A represents the coding order at decoding under the layer progressive scheme. In this case, all the resolutions of the same layer number are first decoded, and then those of the upper layer at the next level are decoded. From the viewpoint of a wavelet coefficient level, decoding is performed in the order from the high-order bit of a coefficient, thereby making it possible to achieve the progressive by which image quality is gradually improved.

FIG. 7B represents the coding order at decoding under the resolution progressive scheme. In this case, all the layers at the same decomposition (resolution) level are first decoded, and then those at the next decomposition (resolution) level are decoded. Accordingly, it is possible to achieve the progressive by which image quality is gradually improved.

The code data of a plurality of images categorized as the resolution, the color element, the layer, or the precinct is generated through each processing of the above-mentioned schemes.

The code data of plural images classified by resolution, color component, layer and precinct is generated through each processing of the above-mentioned schemes.

Furthermore, the code data is rearranged in certain order of progressive order in the tag processing shown in FIG. 8.

FIG. 8 is an explanation chart for the rearranging of the code data in the RPCL Progressive order scheme. It is classified into four resolutions(R0-R3), three color components (C0-C2), one precinct, and one layer per rectangular area. As a result, twelve packet(code data) is generated. "MH" shown in FIG. 8 is a main header and "SOT" is a marker. These are added to the header part of the code data.

If the code data is rearranged in the order that is shown in FIG. 8, the code data is rearranged in the order of the resolution in each rectangular area. As a result, it is possible to display the image data of the code data that is decoded so that the resolution improves sequentially. However, if the image data divides into at least one rectangular area, the function of the tile part is used.

If the tile part is used, it is possible to display and decode all rectangular areas that improve from a low resolution to a high resolution sequentially. However, the function of the tile part is accessed to the code data of all rectangular areas. The function of tile part needs lots of memory. When the function of the tile part is used, the code data is generated from the image data in FIG. 9. FIG. 9 shows an example of the tile part of each resolution.

The viewer/browser 12 displays a window on the screen of the display device 3, and displays the image data there. It is possible to change the size of the window displayed on the screen of the display device 3 by the input device 5. These conditions are notified to the image processing program 10. The viewer/browser 11 notifies the image processing program the condition which is at least one of the resolution, image quality, color component, position, region of interesting, frame rate, amount of the code data, and processing time.

The viewer/browser 11 selectively decodes the code data using the image processing program 10 so that the viewer/browser 11 displays the image data which the user desires.

Figure 10:
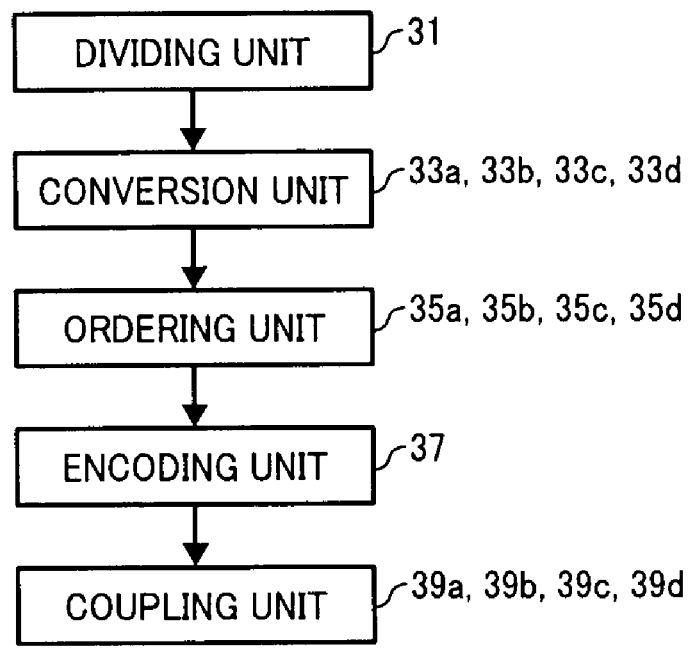
FIG. 10 is an example of executing the image processing apparatus that applies the image processing program 10 to the computer.

An example of executing the image processing apparatus that applies the image processing program 10 to the computer shown in FIG. 10 is now provided.

The image processing apparatus shown in FIG. 10 encodes the image data into the code data. The image processing apparatus shown in FIG. 10 includes the dividing unit 31, the conversion unit 33a-d, the ordering unit 35a-d, the encoding unit 37, and the coupling unit 39a-d.

The dividing unit 31 divides the image data into at least one rectangular area. The conversion unit 33a-d convert the rectangular area to plural frequency coefficients by using frequency conversion. The ordering unit 35a-d add the priority order to the conversion data that was generated by the conversion unit 33a-d. The encoding unit 37 rearranges the conversion data based on the priority order that is added by the ordering unit 35a-d. Furthermore, the encoding unit 37 encodes the rearranged conversion data. As a result, the code stream is generated by encoding processing in the encoding unit 37. The coupling unit 39a-d adds a marker that can identify the priority order in the header part of the conversion data to the code stream.

Thus, the code data of all rectangular areas is not rearranged like the prior art in this embodiment. The image processing apparatus shown in FIG. 10 is processed in each rectangular area, and inserts the identifier into the code stream.

The conversion data is good in either the frequency band data, the color component data, the image quality data or the small area data.

Figure 11:
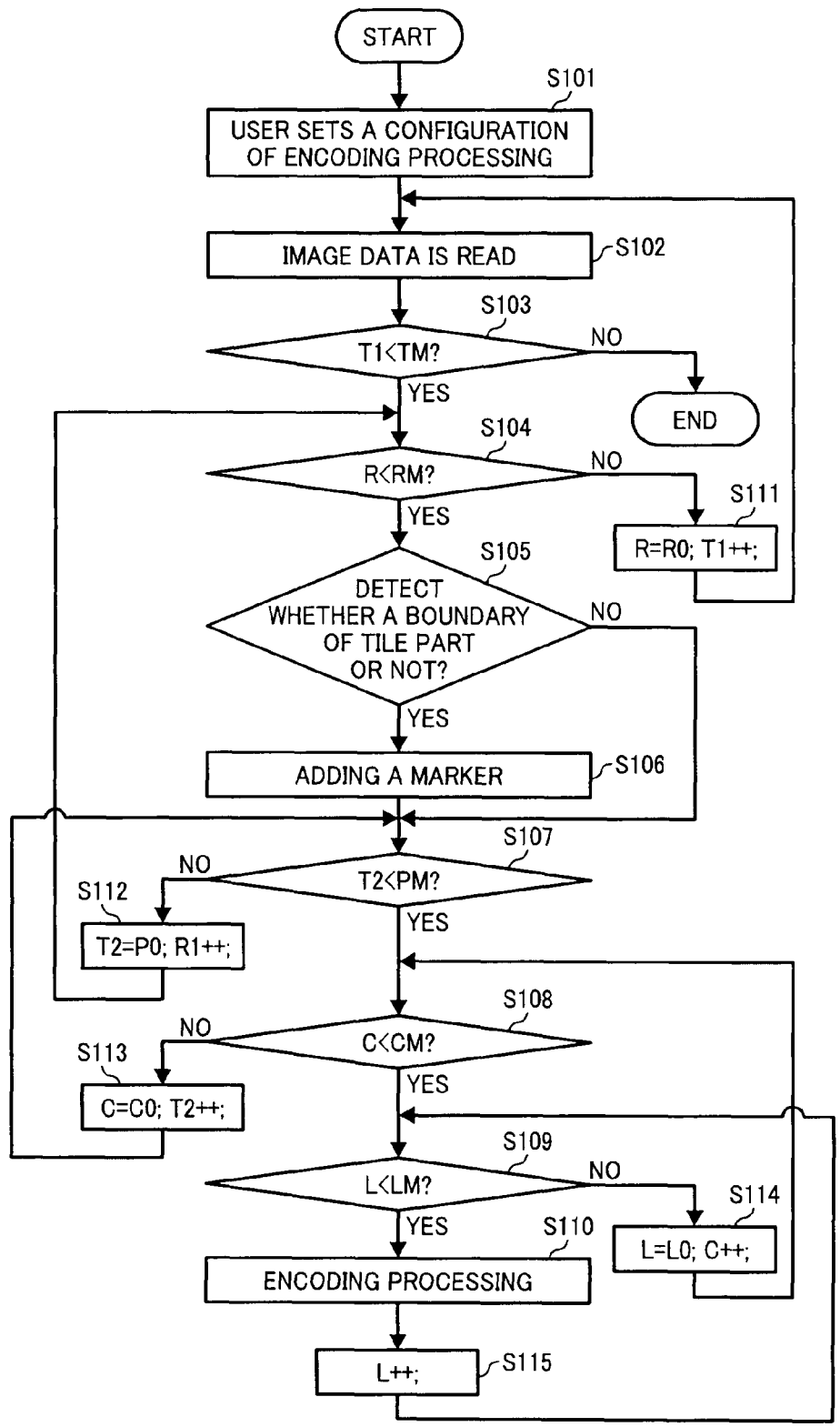
FIG. 11 is a flow diagram showing an example of the image processing program 10 in first embodiment.

FIG. 11 is a flow diagram showing an example of the image processing program 10 in the above embodiment.

In step 101, the condition of the encoding processing is set by by the user. The resolution is divided into as a tile part is set as follows. "RM" is the number of the resolution division levels. "CM" is the number of color component. "PM" is the number of the precinct division. "LM" is the number of the layer division. "Ri" is the tile part division boundary resolution.

Ri=(R0, R1, R2, R3)

It is possible to use other than progressive order, although progressive order RPCL is used in this embodiment. "T1" is the number of rectangular area of image data under processing. "R" is the resolution level. "T2" is the precinct. "C" is the color component. "L" is the layer number. These are set to an initial value.

In step 102, the image data to be encoded is read. It is also possible to process this step when the encoding processing is done. Moreover, it is also possible to divide each specific size, and to process it before encoding processing.

In step 103, it is determined whether the tile of the image data "T1" has reached the number of encoding tiles "TM". If the "T1" has reached "TM", the process ends. If the "T1" has not reached "TM", the process proceeds to step 104.

In step 104, it is determined whether the resolution level "R" has reached the number of encoding resolution level "RM". If the "R" has reached "RM", the process shifts to step 111. If the "R" does not reach "RM", the process shifts to step 105.

In step 105, it is determined whether the resolution level is included in sets of the tile part boundaries "Ri". If the resolution level is included in the sets of the tile part boundaries "Ri", the process shifts to step 106. If the resolution level is not included in sets of the tile part boundaries "Ri", the process shifts to step 107. It is also possible to change the boundary of the tile part of each rectangular area. In a rectangular area without the tile part division, the sets of the tile part boundaries become empty sets.

In step 106, the marker that identifies the boundary of the tile part is added. This marker includes the parameter which is the length of the tile part. This parameter is an irregular value first. However, this parameter is updated when the length of the tile part is determined.

In step 107, it is determined whether the precinct "T2" has reached the number of encoding precints "PM". If the "T2" has reached "PM", the process shifts to step 112. If the "T2" has not reached "PM", the process shifts to step 108.

In step 108, it is determined whether the color component "C" has reached the number of encoding component "CM". If the "C" has reached "CM", the process shifts to step 113. If the "C" has not reached "CM", the process shifts to step 109.

In step 109, it is determined whether the layer number "L" has reached the number of encoding layer "LM". If the "L" has reached "LM", the process shifts to step 114. If the "L" has not reached "LM", the process shifts to step 110.

In step 110, the encoding processing is processed to the data of the resolution "R", the precinct "P", the color component "C", and the layer "L". The process then shifts to step 115 after the encoding processing.

In step 111, the initial value is set to "R0", as for the resolution "R". One is added to the tile number "T1".

In step 112, the initial value is set to "P0", as for the precinct "T2". One is added to the resolution number "R".

In step 113, the initial value is set to "C0", as for the color component number "C". One is added to the precinct number "T2".

In step 114, the initial value is set to "L0", as for the layer number "L". One is added to the component number "C".

In step 115, one is added to the layer number "L".

Figures 12, 13:
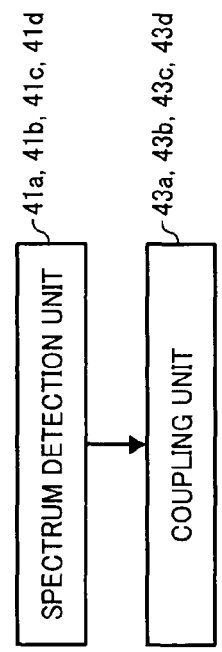
FIG. 12 shows the code data of the tile part that is generated by the result of FIG. 11.
FIG. 13 is an example of executing the image processing apparatus that applies the image processing program 10 to the computer.

FIG. 12 shows the code data of the tile part that is generated by the result of the above flow diagram.

The code data generated by a conventional rearranged tile part in each resolution is shown in FIG. 9. However, this invention inserts the identifier in each rectangular area, as shown in FIG. 12. In a word, the code data is lumped by this invention. The code data of each rectangular area is divided into tile parts in each resolution.

The above code data only has to process the targeted rectangular area. Therefore, the amount of the memory that is used compared with the prior art decreases very much. The processing time is also reduced compared with the prior art, when this embodiment is executed.

(Second Embodiment)

Another example of executing the image processing apparatus that applies the image processing program 10 to the computer is shown in FIG. 13.

The image processing apparatus shown in FIG. 13 divides the image data into at least one rectangular area, and converts the rectangular area into conversion data. Furthermore, the image processing apparatus encodes the conversion data into the code stream.

The image apparatus includes the spectrum detection unit 41a-d and the coupling unit 43a. The spectrum detection unit 41a detects the boundary of the frequency band from the code stream of at least one rectangular area. The coupling unit 43a adds a marker that can identify the band in the header part of the band data that is detected by the spectrum detection unit 41a.

Moreover, the example of another embodiment of the image processing apparatus is shown in FIG. 13. The image processing apparatus divides the image data into at least one rectangular area. The color conversion converts the rectangular area into the conversion data. Furthermore, the image processing apparatus encodes the conversion data into the code stream.

The image apparatus includes the spectrum detection unit 41b and the coupling unit 43b. The spectrum detection unit 41b detects the boundary of the color component from the code stream of at least one rectangular area. The coupling unit 43b adds a marker that can identify the color component with the header part of the color component data that is detected by the spectrum detection unit 41b.

Moreover, the example of another embodiment of the image processing apparatus is shown in FIG. 13. The image processing apparatus divides the image data into at least one rectangular area. The image processing apparatus divides the rectangular area into a bit-plane. The code stream is formed with the sets of plural bit-planes.

The image apparatus includes the spectrum detection unit 41c and the coupling unit 43c. The spectrum detection unit 41c detects the boundary of the sets of plural bit-planes. The coupling unit 43c adds a marker that can identify the sets of plural bit-planes with the header part of the sets of plural bit-planes that is detected by the spectrum detection unit 41c.

Moreover, the example of another embodiment of the image processing apparatus is shown in FIG. 13. The image processing apparatus divides the image data into at least one rectangular area. Furthermore, the image processing apparatus divides the rectangular area into small areas. The code stream is generated in each small area.

The image apparatus includes the spectrum detection unit 41$d$ and the coupling unit 43$d$. The spectrum detection unit 41$d$ detects the boundary of the small area. The coupling unit 43$d$ adds a marker that can identify the small area with the header part of the small area that is detected by the spectrum detection unit 41$d$.

Figure 14:
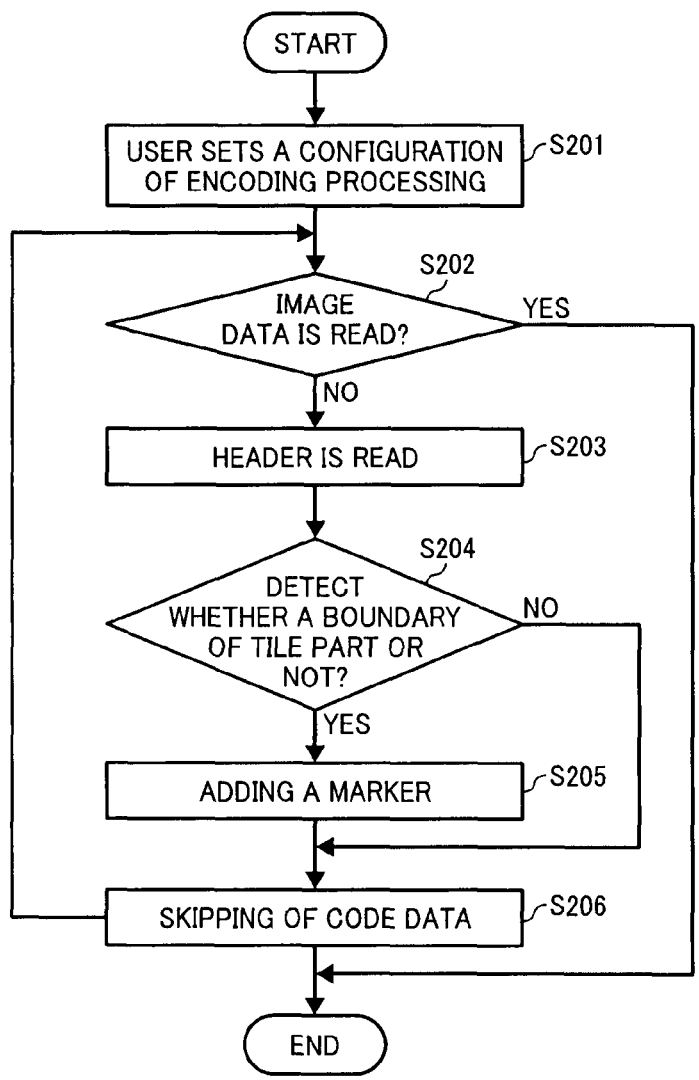
FIG. 14 is a flow diagram showing an example of the image processing program 10 in the second embodiment.

FIG. 14 is a flow diagram showing an example of the image processing program 10 in the above embodiment.

In step 201, the condition of the encoding processing is set by the user. The resolution is set as follows. "T1" is the tile number of the image data. "R" is the resolution level. "T2" is the precinct. "C" is the color component. "L" is the layer number.

Ri=(R0, R1, R2, R3)

In step 202, it is determined whether the code data has reached the terminal or not. If the code data has reached the terminal, the process shifts to END. If the code data has not reached the terminal, the process shifts to step 203.

In step 203, the header of the code data is read.

In step 204, it is determined based on the header whether the code data is the boundary of the tile part division or not. If the code data is the boundary of the tile part division, the process shifts to step 205. If the code data is not the boundary of the tile part division, the process shifts to step 206. Here, the determination of the boundary is based on the header information. It is determined that it is a boundary of the resolution when one previous resolution is different from the resolution under processing.

In step 205, a tile part boundary marker is added to the code data. This marker includes a parameter that is the length of the tile part. This parameter is an irregular value first. However, this parameter is updated when the length of the tile part is determined.

In step 206, the code data is skipped only by the length of the packet read from the header. As a result, the code data shown in FIG. 8 is converted into the code data shown in FIG. 12. The code data is generated by the rearranged tile part in each resolution. However, this embodiment inserts the identifier in each rectangular area. The code data is lumped by this invention. The code data of each rectangular area is divided into a tile part in each resolution.

The above code data only has to process the targeted rectangular area. Therefore, the amount of the memory compared with the prior art decreases very much. The processing time is also reduced very much compared with the prior art when this embodiment is executed.

(Third Embodiment)

Figure 15:
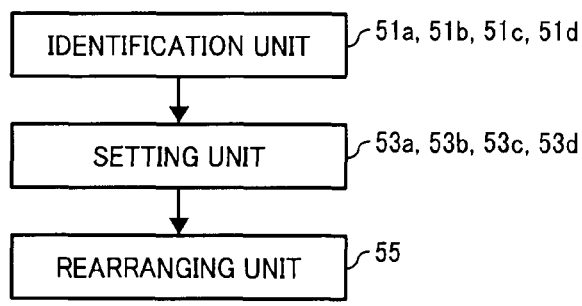
FIG. 15 is an example of executing the image processing apparatus that applies the image processing program 10 to the computer.

An example of executing the image processing apparatus that applies the image processing program 10 to the computer is shown in FIG. 15.

The image processing apparatus shown in FIG. 15 divides the image data into at least one rectangular area, and converts the rectangular area into conversion data. Furthermore, the image processing apparatus encodes the conversion data into the code stream.

The image apparatus includes an identification unit 51$a$, a setting unit 53$a$, and a rearranging unit 55. The identification unit 51$a$ identifies a frequency band of the rectangular area from the code stream. The setting unit 53$a$ sets an order of the frequency band that is identified by the identification unit 51$a$. The rearranging unit 55 rearranges the code data that is generated by an encoding processing based on the order of the frequency band. Furthermore, the code stream is generated to couple to the code data of the rectangular area.

Moreover, an example of another embodiment of the image processing apparatus is shown in FIG. 15. The image processing apparatus divides the image data into at least one rectangular area. The color conversion converts the rectangular area into conversion data. Furthermore, the image processing apparatus encodes the conversion data into the code stream.

An identification unit 51$b$ identifies a color component of the rectangular area from the code stream. A setting unit 53$a$ sets an order of the color component that is identified by the identification unit 51$b$. A rearranging unit 55 rearranges code data that is generated by an encoding processing based on the order of the color component. Furthermore, the code stream is generated to couple to the code data of the rectangular area.

Moreover, an example of another embodiment of the image processing apparatus is shown in FIG. 15. The image processing apparatus divides the image data into at least one rectangular area. The image processing apparatus divides the rectangular area into a bit-plane. The code stream is formed with the sets of plural bit-planes.

An identification unit 51$c$ identifies the sets of plural bit-planes of the rectangular area from the code stream. A setting unit 53$c$ sets an order of the sets of plural bit-planes that is identified by the identification unit 51$c$. A rearranging unit 55 rearranges a code data that is generated by an encoding processing based on the order of the sets of plural bit-planes. Furthermore, the code stream is generated to couple to the code data of the rectangular area.

Moreover, an example of another embodiment of the image processing apparatus is shown in FIG. 15. The image processing apparatus divides the image data into at least one rectangular area. Furthermore, the image processing apparatus divides the rectangular area into small areas. The code stream is generated in each small area.

An identification unit 51$d$ identifies the small area of the rectangular area from the code stream. A setting unit 53$d$ sets an order of the small area that is identified by the identification unit 51$d$. A rearranging unit 55 rearranges a code data that is generated by an encoding processing based on the order of the small area. Furthermore, the code stream is generated to couple to the code data of the rectangular area.

Figure 16:
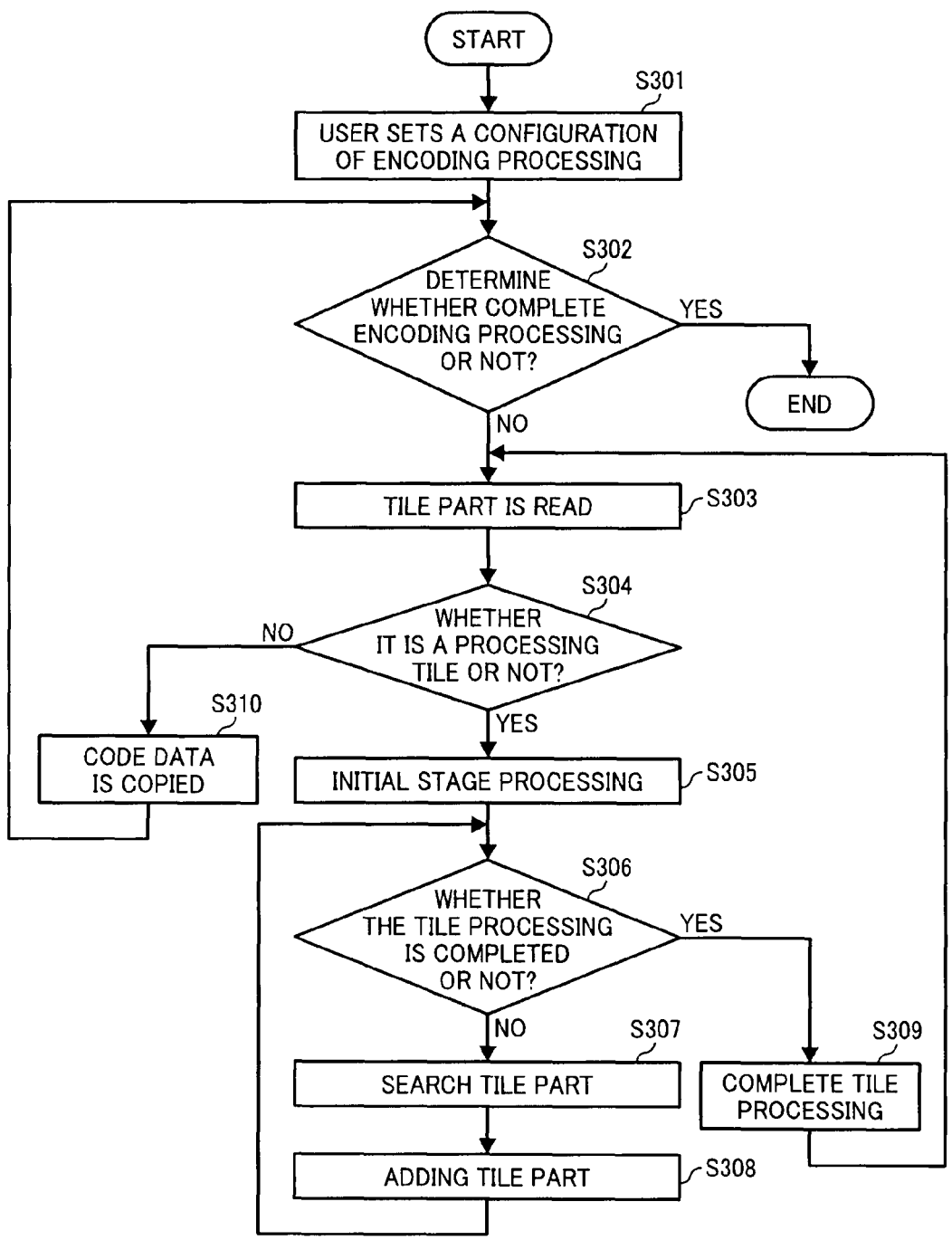
FIG. 16 is a flow diagram showing an example of the image processing program 10 in third embodiment.

FIG. 16 is a flow diagram showing an example of the image processing program 10 in the above embodiment.

In step 301, the condition of the encoding processing is set by the user. The sets of the tile number "Ti" coupled to a tile part is set as follows.

Ti=(T0, T1, T2, T3)

"T" is a tile number of an image data. "TP" is a tile part number. "FP1" is a first code data pointer. "FP2" is a second code data pointer. These are set to initial values.

In step 302, it is determined whether an encoding processing has ended or not. If the encoding processing has ended, the process ends. If the encoding processing has not ended, the process shifts to step 303.

In step 303, a tile part header is read by the first code data pointer "FP1" and the tile number is acquired.

In step 304, it is determined whether the tile number "T" is included in "Ti". If "T" is included in "Ti", the process shifts to step 305. If "T" is not included in "Ti", it shifts to step 310.

In step 305, a first code data pointer "FP1" is recorded.

FP2=FP1

A length of the tile part is acquired from the tile part header. And the tile part data is coupled to the code data.

In step 306, it is determined whether all the tile parts of the tile "T" under processing were read or not. If all the tile parts were read, the process shifts to step 309. If all the tile parts are not read, the process shifts to step 307.

In step 307, the tile part is searched sequentially, and the tile part to which the tile number is corresponding is found.

In step 308, code data is coupled to the tile part that is found by the step 307.

In step 309, a first code data pointer "FP1" is reset in a second code data pointer "FP2".

FP2=FP1

In step 310, the tile part is copied onto the code data.

The code data is generated by the rearranged tile part in each resolution. However, this embodiment inserts an identifier in each rectangular area. The code data is lumped by this invention. The code data of each rectangular area is divided into a tile part in each resolution.

The above code data only has to process the targeted rectangular area. Therefore, the amount of the memory used compared with the prior art is greatly reduced. The processing time is also reduced compared with the prior art, when this embodiment is executed.

(Fourth Embodiment)

Figure 17:
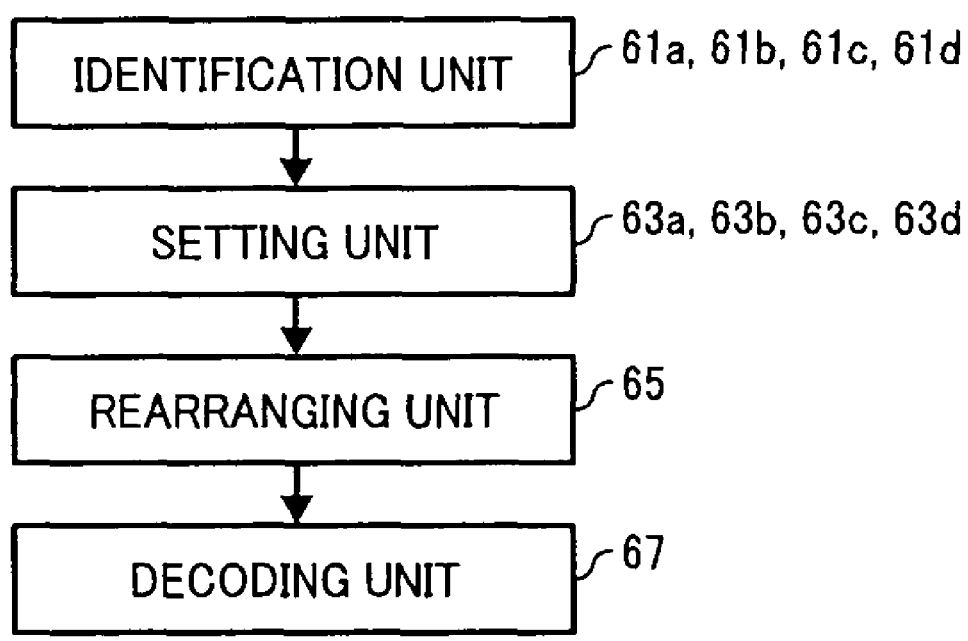
FIG. 17 is an example of executing the image processing apparatus that applies the image processing program 10 to the computer.

An example of executing the image processing apparatus that applies the image processing program 10 to the computer is shown in FIG. 17.

The image processing apparatus shown in FIG. 17 divides the image data into at least one rectangular area, and converts the rectangular area into the conversion data. Furthermore, the image processing apparatus encodes the conversion data into the code stream. The image processing apparatus decodes the code stream using a marker that can identify the priority order.

The image apparatus includes a identification unit 61*a*, a setting unit 63*a*, a rearranging unit 65, and a decoding unit 67. The identification unit 61*a* identifies a frequency band of the rectangular area from the code stream. The setting unit 53*a* sets an order of the frequency band that is identified by the identification unit 61*a*. The rearranging unit 65 rearranges code data that is generated by an encoding processing based on the order of the frequency band. Furthermore, the code stream is generated to couple to the code data of the rectangular area. Finally, the decoding unit 67 decodes the code data.

Moreover, an example of another embodiment of the image processing apparatus is shown in FIG. 17. The image processing apparatus divides the image data into at least one rectangular area. The color conversion converts the rectangular area into the conversion data. Furthermore, the image processing apparatus encodes the conversion data into the code stream. Finally, the code stream is decoded.

An identification unit 61*b* identifies a color component of the rectangular area from the code stream. A setting unit 63*a* sets an order of the color component that is identified by the identification unit 61*b*. A rearranging unit 65 rearranges code data that is generated by an encoding processing based on the order of the color component. Furthermore, the code stream is generated to couple to the code data of the rectangular area. Finally, the decoding unit 67 decodes the code data.

Moreover, an example of another embodiment of the image processing apparatus is shown in FIG. 17. The image processing apparatus divides the image data into at least one rectangular area. The image processing apparatus divides the rectangular area into a bit-plane. The code stream is formed with the sets of plural bit-planes. Finally, the code stream is decoded.

An identification unit 61*c* identifies the sets of plural bit-planes of the rectangular area from the code stream. A setting unit 63*c* sets an order of the sets of plural bit-planes that is identified by the identification unit 61*c*. A rearranging unit 65 rearranges code data that is generated by an encoding processing based on the order of the sets of plural bit-planes. Furthermore, the code stream is generated to couple to the code data of the rectangular area. Finally, the decoding unit 67 decodes the code data.

Moreover, an example of another embodiment of the image processing apparatus is shown in FIG. 17. The image processing apparatus divides the image data into at least one rectangular area. Furthermore, the image processing apparatus divides the rectangular area into small areas. The code stream is generated in each small area. Finally, the code stream is decoded.

An identification unit 61*d* identifies the small area of the rectangular area from the code stream. A setting unit 63*d* sets an order of the small area that is identified by the identification unit 61*d*. A rearranging unit 65 rearranges a code data that is generated by an encoding processing based on the order of the small area. Furthermore, the code stream is generated to couple to the code data of the rectangular area. Finally, the decoding unit 67 decodes the code data.

FIG. 18 is a flow diagram showing an example of the image processing program 10 in the above embodiment.

In step 401, the condition of the encoding processing is set by the user. The tile number "Ti" coupled to a tile part is set as follows.

Ti=(T0, T1, T2, T3)

"T" is a tile number of an image data. "TP" is a tile part number. "FP1" is a first code data pointer. "FP2" is a second code data pointer. These are set to initial values.

In step 402, it is determined whether a decoding processing has ended or not. If the decoding processing has ended, the process ends. If the decoding processing has not ended, the process shifts to step 403.

In step 403, a tile part header is read by the first code data pointer "FP1", and the tile number is acquired.

In step 404, it is determined whether the tile number "T" is included in "Ti". If "T" is included in "Ti", the process shifts to step 405. If "T" is not included in "Ti", the process shifts to step 410.

In step 405, a first code data pointer "FP1" is recorded.

FP2=FP1

A length of the tile part is acquired from the tile part header, and the tile part data is coupled to the code data.

In step 406, it is determined whether all the tile parts of the tile "T" under processing were read or not. If all the tile parts were read, the process shifts to step 409. If all the tile parts were not read, the process shifts to step 407.

In step 407, the tile part is searched sequentially, and the tile part to which the tile number is corresponding is found.

In step 408, code data is coupled to the tile part that is found in step 407.

In step 409, a first code data pointer "FP1" is reset in a second code data pointer "FP2".

FP2=FP1

In step 410, the tile part is decoded.

The above code data only has to process the targeted rectangular area. Therefore, the amount of memory used compared with the prior art decreases. The processing time is also reduced compared with the prior art, when this invention is executed.

What is claimed is:

1. An image processing apparatus for generating a code stream that encodes image data, comprising:
   a dividing unit configured to divide the image data into at least one rectangular area;
   a conversion unit configured to convert the at least one rectangular area divided by the dividing unit into conversion data;

an ordering unit configured to add a priority order to the conversion data;

an encoding unit configured to rearrange the conversion data based on the priority order to arrange, adjacently in the code stream, the conversion data of the at least one rectangular area, and to encode the conversion data into the code stream; and a coupling unit configured to add a same marker in a header part of the conversion data for each of a plurality of resolutions of the at least one rectangular area to identify the priority order of the conversion data in the code stream.

2. The image processing apparatus of claim 1, wherein the conversion unit is configured to convert the at least one rectangular area into the conversion data, the conversion data being one of color component data, set data of a bit-plane, and small area data.

3. A method of image processing that generates a code stream that encodes image data, comprising:

dividing the image data into at least one rectangular area;

converting the at least one rectangular area divided in the dividing into conversion data;

setting a priority order to the conversion data;

rearranging the conversion data based on the set priority order to arrange, adjacently in the code stream, the conversion data of the at least one rectangular area, and encoding the conversion data into the code stream; and adding a same marker that identifies the priority order to the header part of the conversion data in the code stream for each of a plurality of resolutions of the at least one rectangular area.

4. The method of image processing as claimed in claim 3, wherein the conversion data is one of color component data, set data of a bit-plane, and small area data.

* * * * *